(12) United States Patent
Ueda et al.

(10) Patent No.: US 7,506,565 B2
(45) Date of Patent: Mar. 24, 2009

(54) LATHE

(75) Inventors: Toshio Ueda, Yamatokoriyama (JP);
Masafumi Hino, Yamatokoriyama (JP);
Tsuyoshi Fujimoto, Yamatokoriyama (JP)

(73) Assignee: Mori Seiki Co., Ltd., Yamatokoriyama-shi (JP)

(*) Notice: Subject to any disclaimer, the term of this patent is extended or adjusted under 35 U.S.C. 154(b) by 194 days.

(21) Appl. No.: 11/514,314

(22) Filed: Sep. 1, 2006

(65) Prior Publication Data

US 2007/0084319 A1     Apr. 19, 2007

(30) Foreign Application Priority Data

Oct. 14, 2005   (JP) .............................. 2005-300528

(51) Int. Cl.
*B23B 3/00*      (2006.01)
*B23B 13/00*     (2006.01)

(52) U.S. Cl. ....................................................... 82/124

(58) Field of Classification Search .................. 82/117, 82/121, 124, 126, 127, 129, 157, 158, 162; 483/17–27, 58; 269/50, 55, 58; 29/281.1
See application file for complete search history.

(56) References Cited

U.S. PATENT DOCUMENTS

| | | | | |
|---|---|---|---|---|
| 4,061,062 A | * | 12/1977 | Peltier | 82/125 |
| 6,904,665 B2 | * | 6/2005 | Walz | 29/563 |
| 2002/0020258 A1 | * | 2/2002 | Grossmann | 82/121 |

FOREIGN PATENT DOCUMENTS

JP       2528744 Y    12/1996

* cited by examiner

*Primary Examiner*—Jason Daniel Prone
*Assistant Examiner*—Jennifer Swinney
(74) *Attorney, Agent, or Firm*—Smith Patent Office

(57) ABSTRACT

To provide a lathe in which a machined workpiece can be pulled out without fail, whereby realizing enhanced reliability in the pull-out operation. First and second tool posts 6, 7 are arranged to be capable of facing each other across a spindle axis A of a spindle headstock 4, and hold parts 30, 31 disposed on turrets 12, 13 of the first and second tool posts 6, 7 hold therebetween a machined workpiece W supported by the spindle headstock 4 to pull out the machined workpiece W from the spindle headstock 4.

4 Claims, 8 Drawing Sheets

LATHE

BACKGROUND OF THE INVENTION

1. Field of the Invention

The present invention relates to a lathe in which a pair of first and second tool posts are disposed between a spindle headstock and a tailstock which are disposed on a bed and the first and second tool posts perform predetermined machining of a workpiece supported by the spindle headstock and the tailstock.

2. Description of the Related Art

In a lathe of this type, a machined workpiece supported by a spindle of a spindle headstock and a tailstock is sometimes taken out to be carried outside a machining area, in order to cope with continuous production. For example, in a Japanese Utility Model Registration No. 2528744, a pull-out board attached to a turret of a tool post is brought into contact with and is hooked to a machined workpiece held by a spindle, and in this state, the tool post is moved toward a tailstock side, whereby the machined workpiece is pulled out from the spindle.

Incidentally, if the pull-out board of the turret is hooked to a machined workpiece to pull out the machined workpiece from the spindle as in the above conventional lathe, it is not sure if the machined workpiece is pulled out without fail, which poses a problem of low reliability in the pull-out operation.

SUMMARY OF THE INVENTION

The present invention was made in consideration of the conventional circumstances described above and it is an object thereof to provide a lathe in which a machined workpiece can be pulled out without fail, thereby realizing enhanced reliability in the pull-out operation.

In an invention, a lathe includes: a bed; a spindle headstock disposed on a longitudinal one side portion of the bed; a tailstock disposed on the other side portion of the bed to be coaxial with a spindle axis of the spindle headstock; and a pair of first and second tool posts disposed between the tailstock and the spindle headstock, wherein the first and second tool posts are arranged to be capable of facing each other across the spindle axis of the spindle headstock, and holding parts that are disposed on turrets of the first and second tool posts are capable of pulling out a machined workpiece supported by the spindle headstock from the spindle headstock by holding the machined workpiece therebetween.

In the invention, since the holding parts disposed on the turrets of the first and second tool posts pull out the machined workpiece by holding the machined workpiece therebetween, the machined workpiece can be pulled out while being held between the first and second tool posts, so that it is possible to realize higher reliability in the pull-out operation than in a case where a turret is hooked to a machined workpiece to pull out the machined workpiece, as has conventionally been done.

In a preferable embodiment of the invention, the first and second tool posts are disposed on a vertical line passing through the axis of the spindle to be on an upper side and a lower side across the spindle axis.

In the above-described embodiment, since the first and second tool posts are disposed on the vertical line passing through the spindle axis to be on the upper side and the lower side across the spindle axis, the machined workpiece is held from above and under, so that it is possible to stably support the machined workpiece without causing its wobbling and displacement.

In another preferable embodiment of the invention, further comprising a workpiece holder having a first support part supporting the machined workpiece which is pulled out and a second support part on which a subsequently machined workpiece is loaded, wherein the workpiece holder is reciprocatable in a direction orthogonal to the spindle axis between a standby position set outside a machining area and a workpiece receiving position where the workpiece holder receives the machined workpiece and the subsequently machined workpiece.

In the above-described embodiment, since the workpiece holder having the first support part supporting the machined workpiece and the second support part on which the subsequently machined workpiece is loaded is reciprocatable between the standby position and the workpiece receiving position, the receipt of the workpiece is enabled with a simple structure.

In still another preferable embodiment of the invention, the workpiece holder is movable in the direction orthogonal to the spindle axis so as to position the second support part at the workpiece receiving position where the second support part receives the subsequently machined workpiece, after the first support part receives the machined workpiece at the workpiece receiving position.

In the above-described embodiment, since the second support part is moved to be positioned at the workpiece receiving position after the first support part receives the machined workpiece at the workpiece receiving position, the second support part can receive the subsequently machined workpiece at a center position of the spindle which is a machining position.

In still another preferable embodiment of the invention, further comprising a workpiece loader having a first workpiece grip part gripping the machined workpiece supported by the first support part and a second workpiece grip part loading the subsequently machined workpiece on the second support part, wherein the workpiece loader is ascendable/descendable in an up/down direction perpendicular to the spindle axis between a workpiece change position where the machined workpiece is changed to the subsequently machined workpiece and a workpiece unloading position from which the machined workpiece is carried out of the lathe.

In the above-described embodiment, since the workpiece loader having the first workpiece grip part gripping the machined workpiece and the second workpiece grip part loading the subsequently machined workpiece is ascendable/descendable between the workpiece change position and the workpiece unloading position, changing of the workpieces is enabled with a simple structure.

In still another preferable embodiment of the invention, the workpiece loader reverses the machined workpiece which is carried out of the lathe by 180 degrees to transfer the machined workpiece to a subsequent machining process or transfer the machined workpiece to a workpiece stocker.

In the above-described embodiment, since the machined workpiece carried out of the lathe is reversed by 180 degrees to be transferred to a subsequent machining process, continuous machining of the workpiece is enabled without separately installing a reversing device in the course of the transfer.

DETAILED DESCRIPTION OF THE PREFERRED EMBODIMENT

An embodiment of the present invention will be hereinafter described based on the attached drawings.

Figure 1:
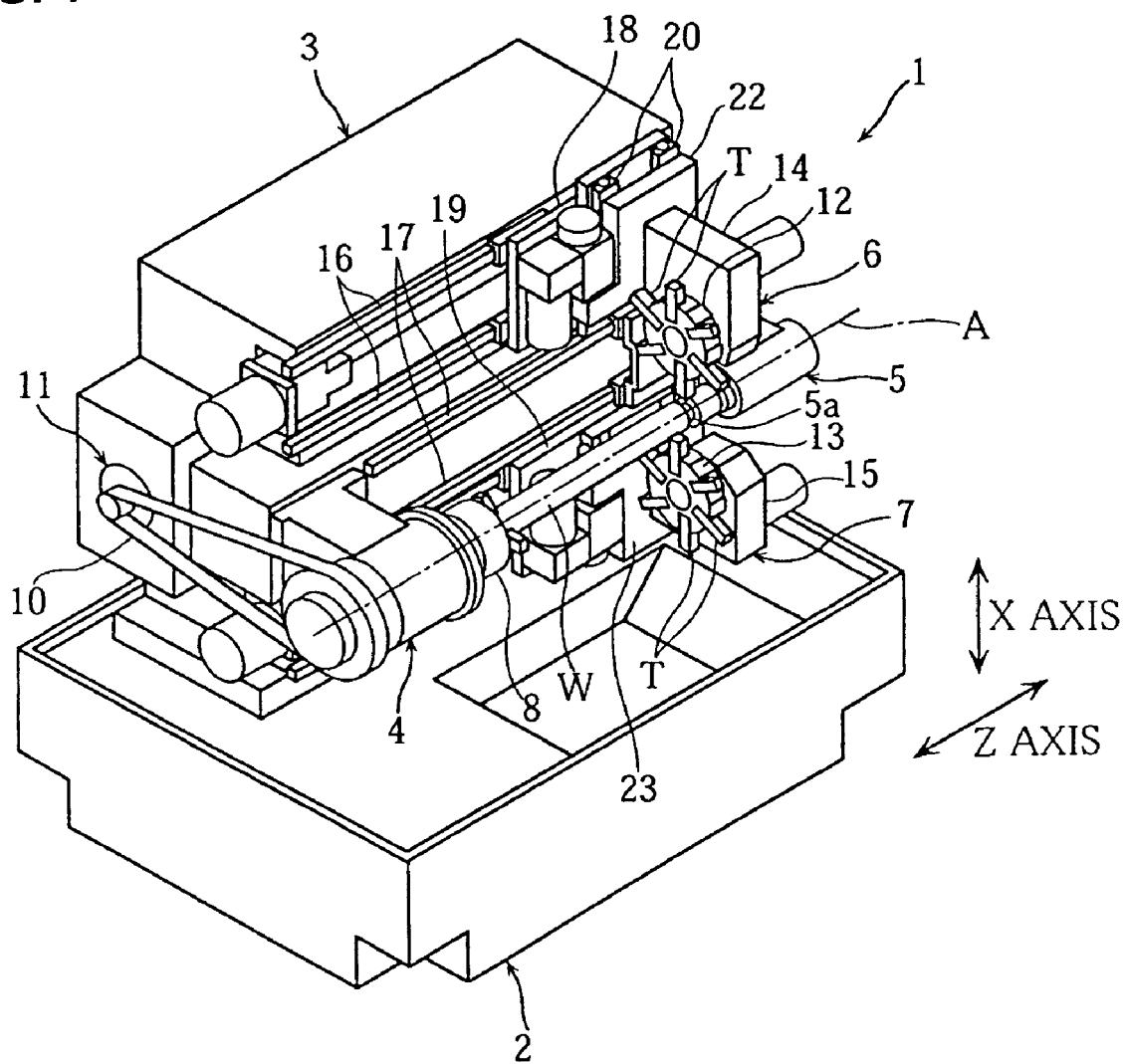
FIG. 1 is a perspective view of a lathe according to one embodiment of the present invention.
Figure 2:
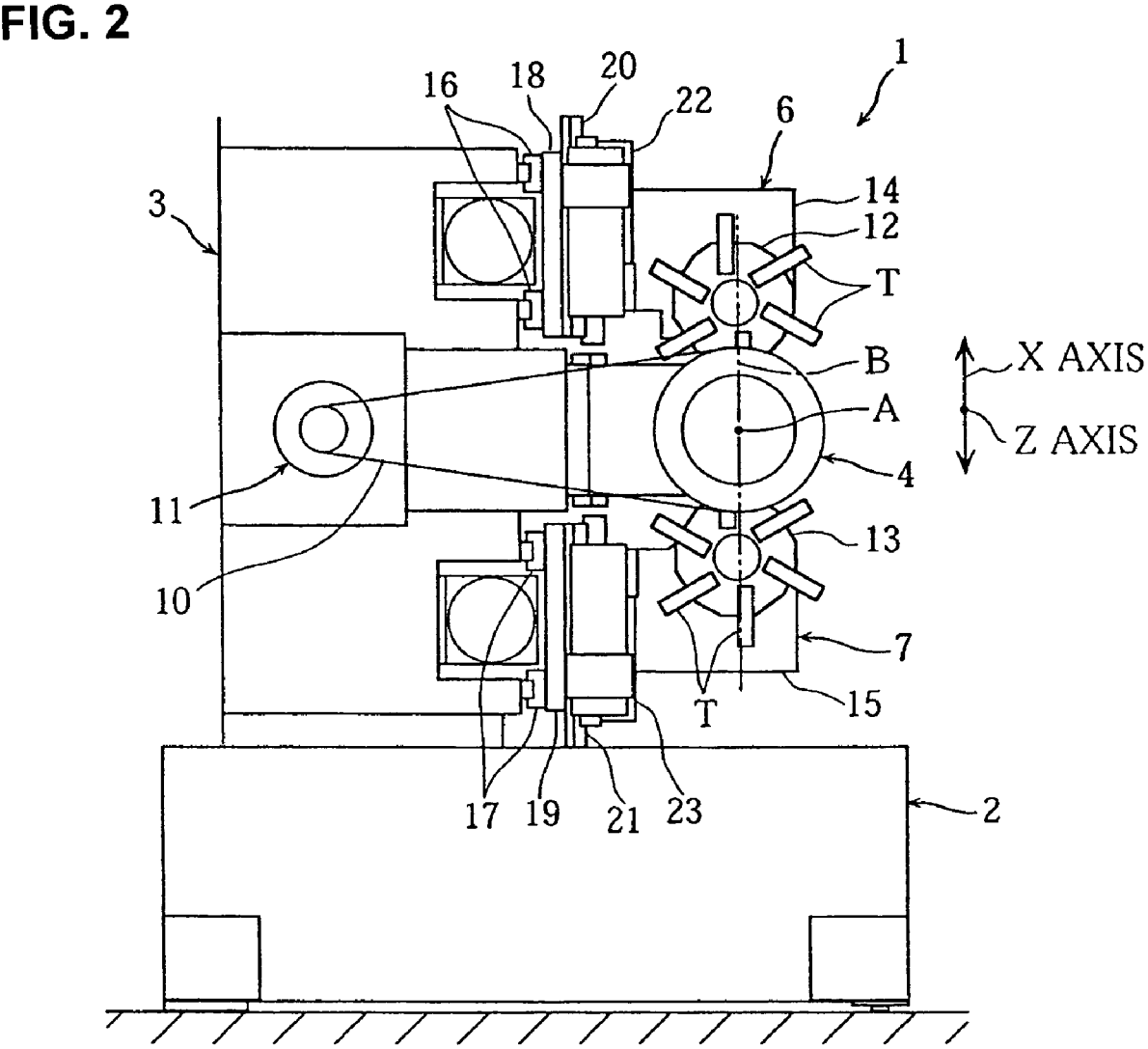
FIG. 2 is a side view of the lathe.

FIG. 1 to FIG. 8 are views to illustrate a lathe according to one embodiment of the present invention. FIG. 1 and FIG. 2 are a perspective view and a right side view of the lathe of this embodiment respectively, FIG. 3 to FIG. 8 are views showing operations of carrying a machined workpiece and a subsequently machined workpiece.

In the drawings, 1 denotes the lathe. When seen from the front side of the machine, the lathe 1 includes: a rectangular bed 2; a column 3 provided to stand on a back portion of the bed 2; a spindle headstock 4 disposed on a longitudinal left portion of the column 3; a tailstock 5 disposed on a right portion of the column 3 to be coaxial with a spindle axis A of the spindle headstock 4; and a pair of first and second tool posts 6, 7 disposed between the tailstock 5 and the spindle headstock 4 of the column 3.

The spindle headstock 4 is fixed to the column 3, a spindle 8 is rotatably supported by the spindle headstock 4, and a chuck 9 gripping a bar-shaped workpiece W in an attachable/detachable manner is disposed on the spindle 8. The spindle 8 is rotary driven by a spindle motor 11 via a driving belt 10.

The tailstock 5 is supported by the column 3 to be movable in a Z-axis direction, and by the tailstock 5, a tailstock spindle 5a pressing and supporting a right end face of the workpiece W is supported to be rotatable and reciprocatable in the Z-axis direction.

The first and second tool posts 6, 7 are arranged to be capable of facing each other across the spindle axis A of the spindle headstock 4 and are arranged on a vertical line B passing through the spindle axis A so as to be vertically symmetrical with respect to the spindle axis A.

The first and second tool posts 6, 7 include: first and second turrets 12, 13 on which a plurality of tools T are attached at intervals in a circumferential direction; and first and second tool post main bodies 14, 15 for rotary indexing the turrets 12, 13 so as to position a desired tool T at a predetermined machining position (around the spindle axis A).

Each of the first and second tool post main bodies 14, 15 is supported to be movable in an X-axis direction and in the Z-axis direction. More specifically, the upper first tool post main body 14 is supported by an upper Z-axis saddle 18 via a pair of upper Z-axis guide rails 16, 16, which are disposed on an upper portion of the column 3, so as to be movable in the Z-axis direction, and is supported by an upper X-axis saddle 22 via a pair of upper X-axis guide rails 20, 20, which are disposed on the upper Z-axis saddle 18, so as to be movable in the X-axis direction. Further, the lower second tool post main body 15 is supported by a lower Z-axis saddle 19 via a pair of lower Z-axis guide rails 17, 17, which are disposed on a lower portion of the column 3, so as to be movable in the Z-axis direction, and is supported by a lower X-axis saddle 23 via a pair of lower X-axis guide rails 21, 21, which are disposed on the lower Z-axis saddle 19, so as to be movable in the X-axis direction.

In a state where the bar-shaped workpiece W is rotated with its left end portion gripped by the chuck 9 of the spindle 8 and its right end face pressed and supported by the tailstock spindle 5a, the tool T at the machining position is cut into the workpiece W while the first and second tool posts 6, 7 relatively move in the X-axis and Z-axis directions, whereby the workpiece W is subjected to predetermined machining. Here, the workpiece machining length by the first and second tool posts 6, 7 of the lathe 1 is about 600 mm.

The lathe 1 includes a workpiece transfer device 25 that transfers the machined workpiece W whose machining has been completed, out of the machine and transfers a subsequently machined workpiece W1 into the machine.

The workpiece transfer device 25 has: a workpiece pull-out mechanism 26 pulling out the machined workpiece W from the spindle 8; a workpiece holder 27 supporting the pulled machined workpiece W and loaded with the subsequently machined workpiece W1; and a workpiece loader 28 carrying out the machined workpiece W supported by the workpiece holder 27 and supplies the subsequently machined workpiece W1 to the workpiece holder 27.

The workpiece pull-out mechanism 26 is structured such that upper and lower hold parts 30, 31 disposed on the turrets 12, 13 of the first and second tool posts 6, 7 hold the machined workpiece W therebetween to pull out the machined workpiece W from the spindle 8. The upper and lower hold parts 30, 31 are attached to tool mounting parts of the turrets 12, 13 and have V grooves 30a, 31a abutting on upper and lower faces of the workpiece W.

The workpiece holder 27 includes a support member 33 having a pair of right and left first support parts 33a, 33a supporting the pulled machined workpiece W and a pair of right and left second support parts 33b, 33b loaded with the subsequently machined workpiece W1. The first and second support parts 33a, 33b extend in parallel to the Z-axis direction and are arranged in parallel to each other, the second support parts 33b being positioned on a more inner side of the machine than the first support parts 33a.

Figure 3:
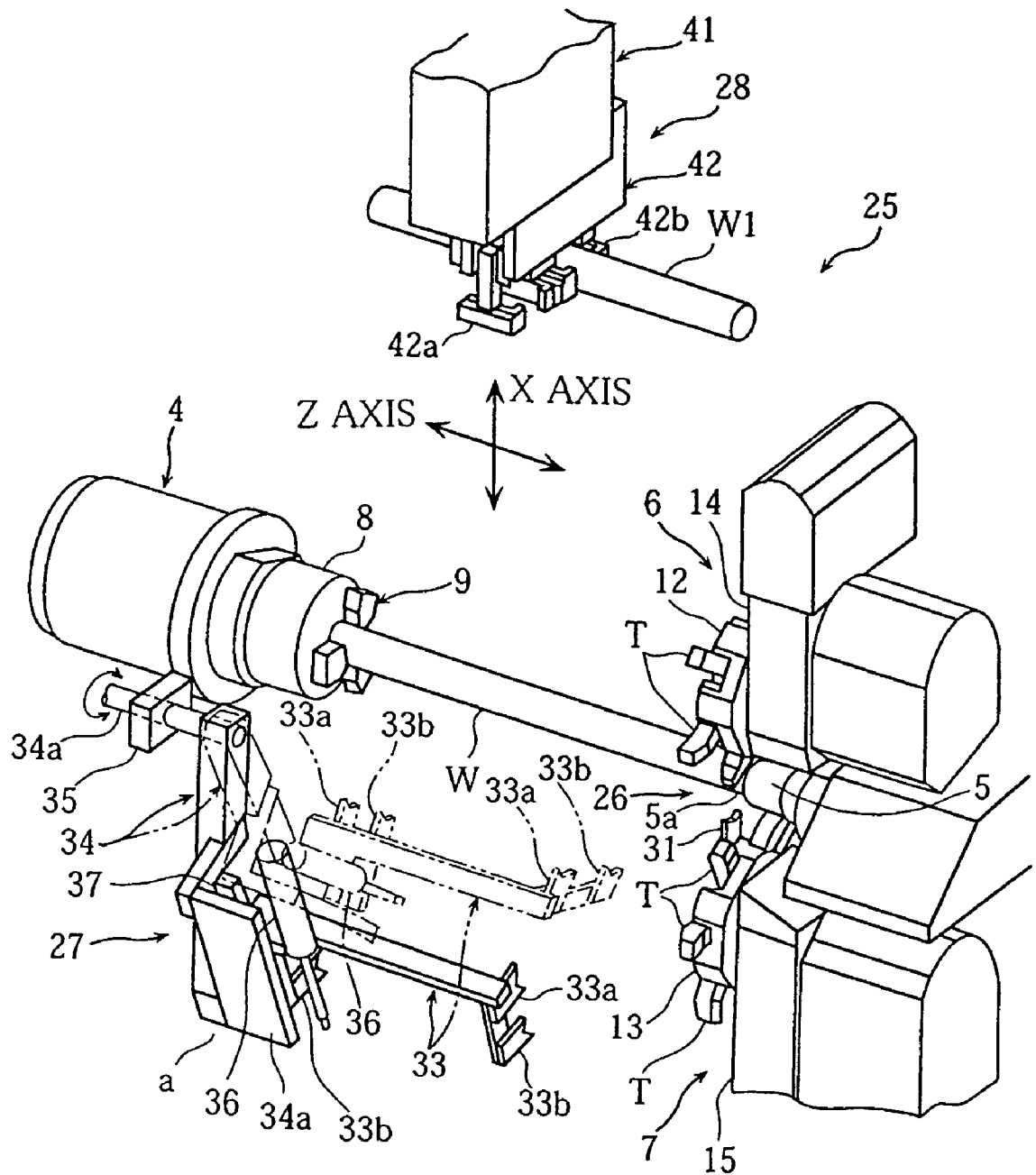
FIG. 3 is a rough perspective view of a workpiece transfer device of the lathe.
Figure 4:
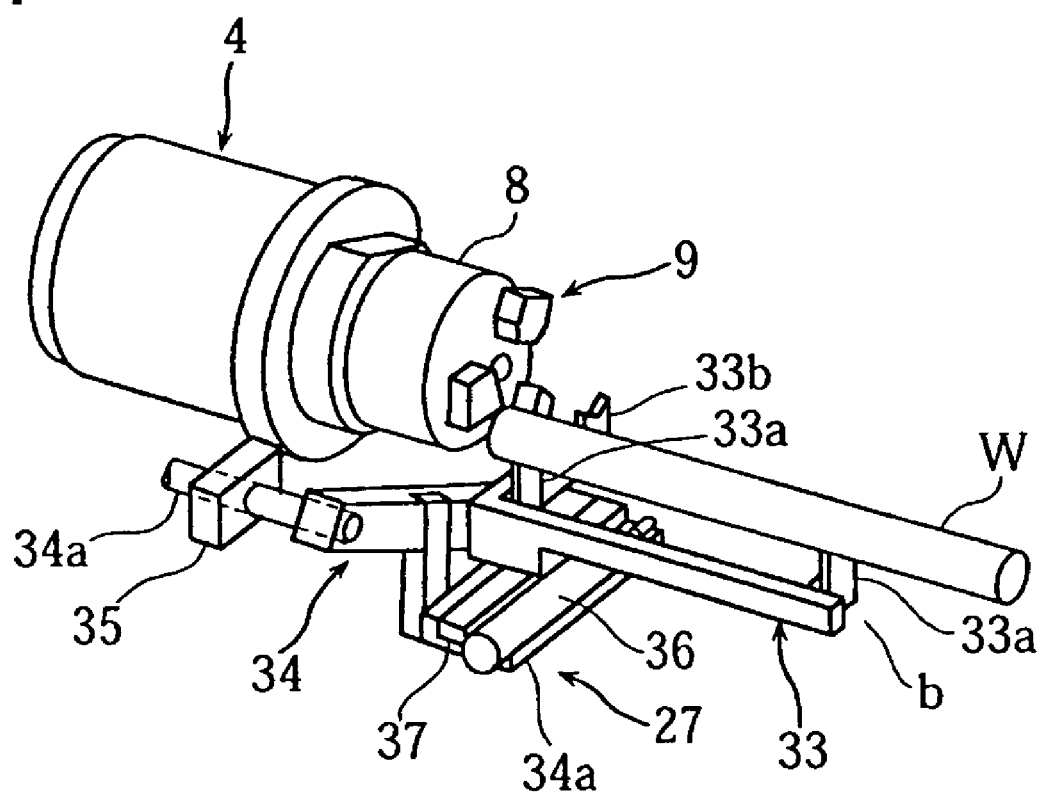
FIG. 4 is a perspective view of a workpiece holder of the workpiece transfer device.

The workpiece holder 27 includes an arm member 34 by which the support member 33 is supported to be rotatable in the up/down direction between a standby position "a" set outside the machining area under the spindle axis A and a workpiece receiving position "b" where the first support parts 33a abut on the lower face of the machined workpiece W (see FIG. 3 and FIG. 4). A rotary shaft 34a of the arm member 34 is pivotally supported by a fixed part 35 fixed to a machine main body side, and is rotary driven by a cylinder or a motor (not shown).

The support member 33 is supported via a guide rail 37 fixed on a base 34b of the arm member 34, so as to be movable in a direction orthogonal to the spindle axis A. Between the arm member 34 and the support member 33, provided is a cylinder 36 reciprocating the support member 33 so that the second support parts 33*b* are positioned at the workpiece receiving position "b".

When the workpiece machining is finished, the arm member 34 turns upward, so that the first support parts 33*a* move to the workpiece receiving position "b". The first and second tool posts 6, 7 rotary index the upper and lower hold parts 30, 31 at the machining position and move in the X-axis direction so as to face each other, so that the upper and lower hold parts 30, 31 hold the right end portion of the machined workpiece W therebetween. The tailstock spindle 5*a* moves backward so that the chuck 9 releases the workpiece W from the gripped state, and the first and second tool posts 6, 7 move toward the tailstock 5 side (rightward in the Z-axis direction). Consequently, the machined workpiece W is pulled out from the spindle 8, the first and second tool posts 6, 7 release the machined workpiece W from the held state, and the first support parts 33*a* receive the machined workpiece W. The cylinder 36 moves the support member 33 so that the first support parts 33*a* move to the outside of the machine and the second support parts 33*b* stand by at the workpiece receiving position "b".

Figure 8:
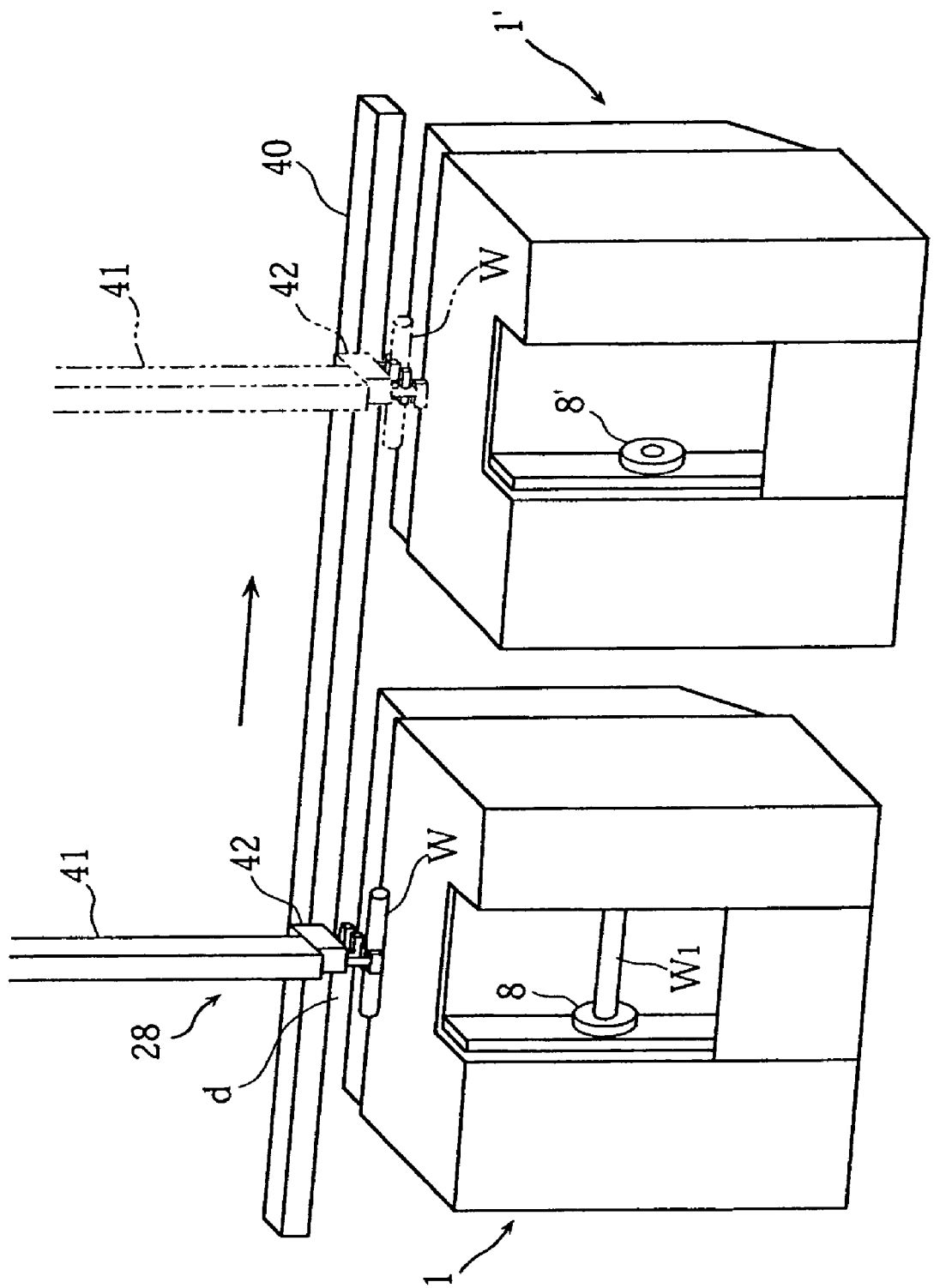
FIG. 8 is a view showing a transfer operation by the workpiece loader.

As shown in FIG. 8, the workpiece loader 28 includes a rail member 40 bridged between upper portions of two lathes 1, 1' arranged in parallel, a slide member (not shown) disposed to be reciprocatable on the rail member 40 between the lathe 1 and the lathe 1', an ascending/descending member 41 supported by the slide member to be ascendable/descendable, and a grip member 42 disposed on a bottom face of the ascending/descending member 41.

Figure 5:
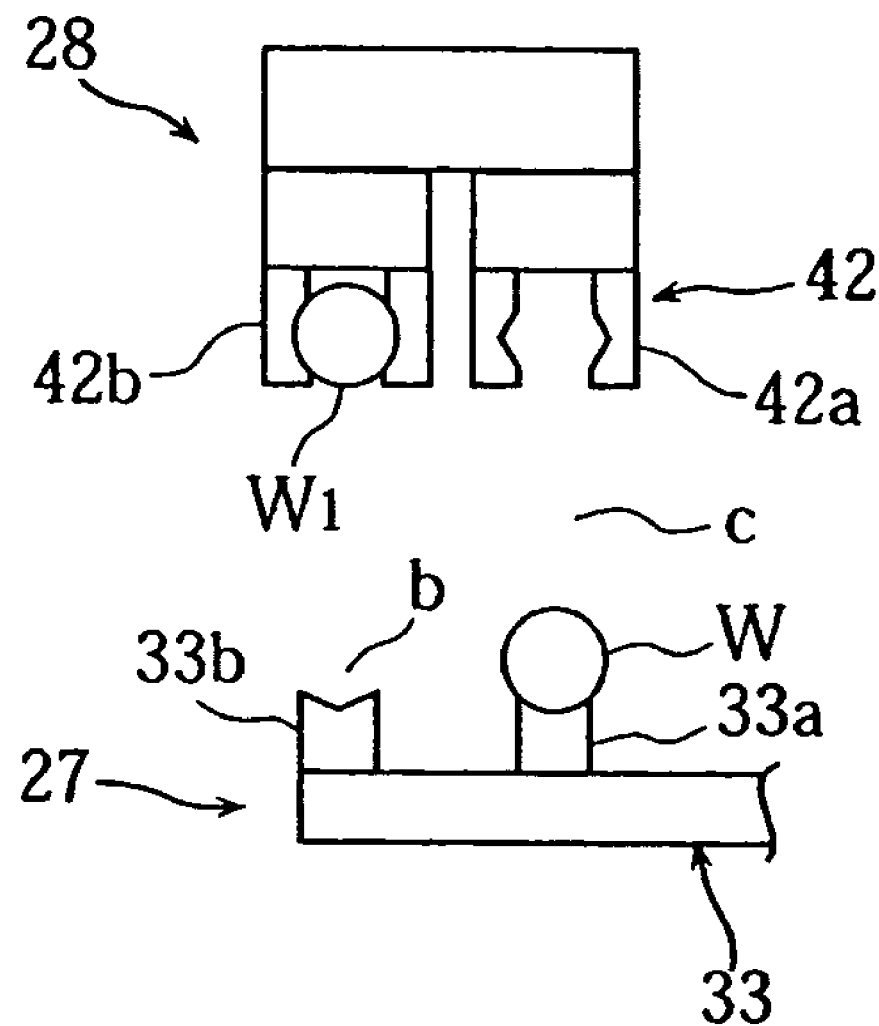
FIG. 5 is a view showing the operation by the workpiece holder.
Figure 6:
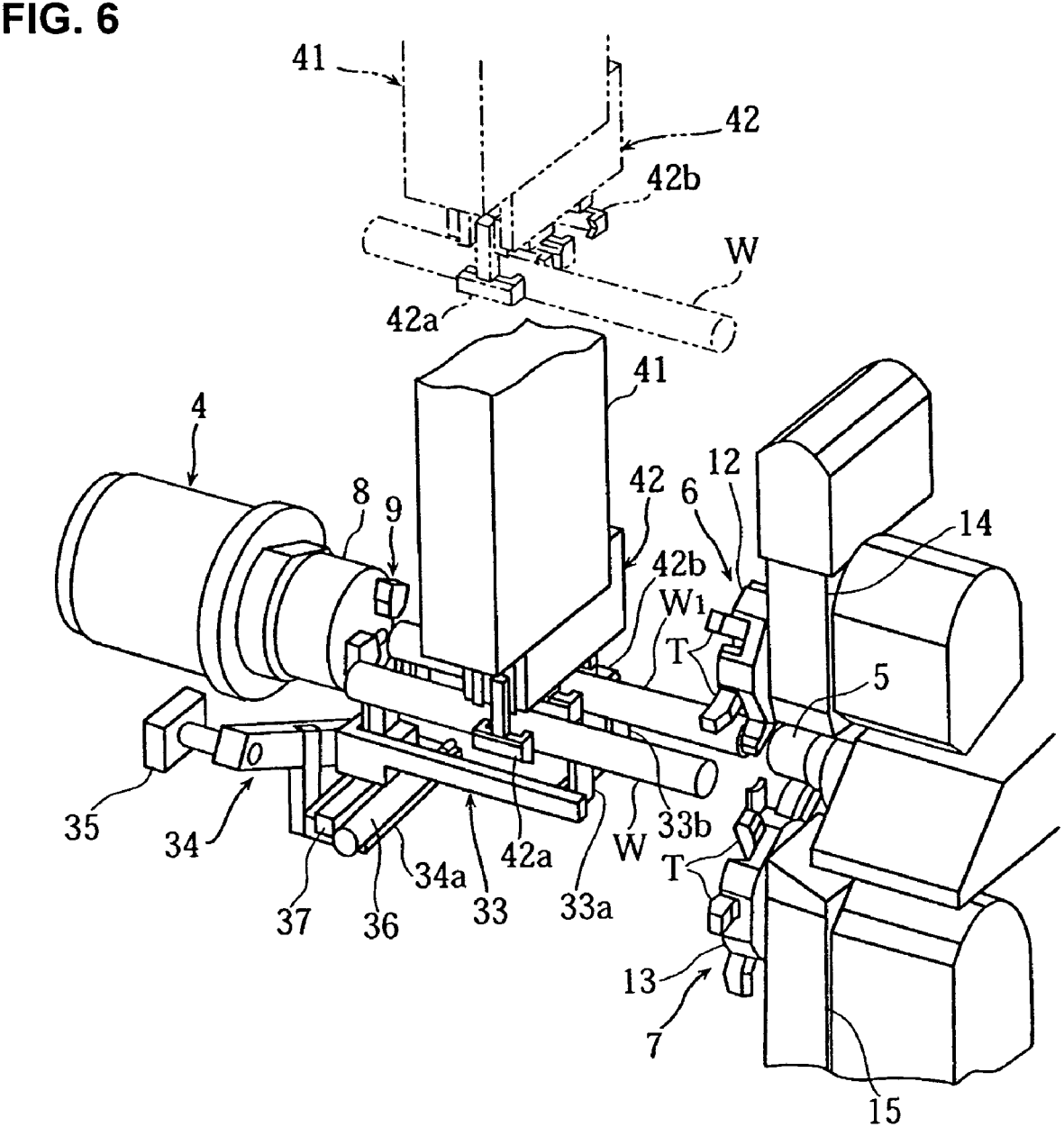
FIG. 6 is a view showing the operation by a workpiece loader of the workpiece transfer device.
Figure 7:
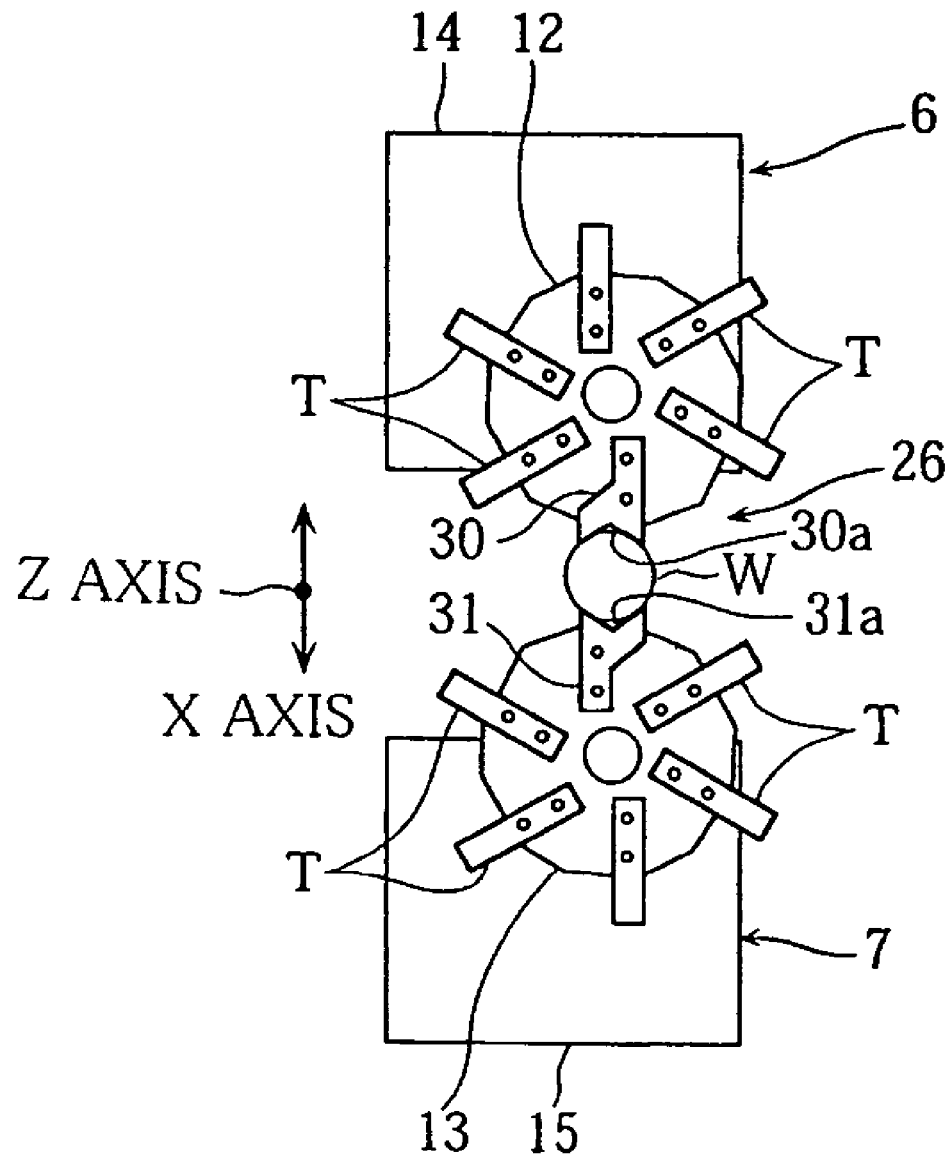
FIG. 7 is a view showing an operation of pulling out a workpiece by first and second tool posts of the workpiece transfer device.

The ascending/descending member 41 is driven to move the grip member 42 in the up/down direction perpendicular to the spindle axis A between a workpiece change position "c" where the machined workpiece W is changed to the subsequently machined workpiece W1 and a workpiece unloading position "d" from which the machined workpiece W is carried out of the machine (see FIG. 5 and FIG. 8).

Further, the ascending/descending member 41 has therein a reversing mechanism (not shown) reversing the grip member 42 by 180 degrees. Consequently, the machined workpiece W is reversed by 180 degrees in the course of transfer on the rail member 40 to be transferred to the next lathe 1', where the machined workpiece W undergoes finish machining.

The grip member 42 has a first workpiece grip part 42*a* gripping the machined workpiece W supported by the first support parts 33*a* and a second workpiece grip part 42*b* loading the subsequently machined workpiece W1, which is gripped thereby in advance, on the second support parts 33*b*.

When the machined workpiece W is loaded on the first support parts 33*a* and the second support parts 33*b* stand by at the workpiece receiving position "b", the ascending/descending member 41 moves down to position the grip member 42 at the -workpiece change position "c", and the first grip part 42*a* grips the machined workpiece W and the second grip part 42*b* loads the subsequently machined workpiece W1 on the second support parts 33*b*.

The tailstock spindle 5*a* moves forward toward the left side in the Z-axis direction to press the subsequently machined workpiece W1 against the spindle 8, and the chuck 9 grips the subsequently machined workpiece W1. The subsequently machined workpiece W1 is rotatably supported by the chuck 9 and the tailstock spindle 5*a*, and the first and second tool posts 6, 7 perform predetermined machining to the subsequently machined workpiece W1. Further, after the subsequently machined workpiece W1 is attached, the arm member 34 turns downward, so that the support member 33 is returned to the standby position "a".

Meanwhile, when the workpiece change is finished, the ascending/descending member 41 moves up to carry out the machined workpiece W to the workpiece W unloading position "d", the slide member transfers the machined workpiece W to the lathe 1', and the machined workpiece W is reversed by 180 degrees in the course of the transfer to be carried to a machining position of the lathe 1'. Similarly to the above, a tailstock spindle (not shown) moves forward so that the machined workpiece W is loaded on a spindle 8' of the lathe 1'.

According to this embodiment, the upper and lower hold parts 30, 31 attached to the first and second turrets 12, 13 of the first and second tool posts 6, 7 hold the machined workpiece W therebetween and the first and second tool posts 6, 7 move rightward in the Z-axis direction to pull out the machined workpiece W from the spindle 8. This ensures that the machined workpiece W is held by the first and second tool posts 6, 7, resulting in higher reliability in the pull-out operation than in a case where a turret is hooked to a machined workpiece to pull out the machined workpiece as has been conventionally done.

In this embodiment, since the first and second tool posts 6, 7 are disposed on the vertical line B passing through the spindle axis A to be arranged on the upper side and the lower side across the spindle axis A, the machined workpiece W is held from the upper and lower directions, which makes it possible to stably support the machined workpiece W without any displacement thereof.

In this embodiment, the support member 33 having the pair of first support parts 33*a*, 33*a* supporting the machined workpiece W and the pair of second support parts 33*b*, 33*b* loaded with the subsequently machined workpiece W1 is reciprocatable in the up/down direction between the standby position "a" outside the machining area and the workpiece receiving position "b". Therefore, the receipt of the machined workpiece W and the subsequently machined workpiece W1 is enabled with a simple structure.

Further, when the first support parts 33*a*, 33*a* receive the machined workpiece W at the workpiece receiving position "b", the second support parts 33*b*, 33*b* are moved toward the machine front side so as to be positioned at the workpiece receiving position "b". This makes it possible to receive the subsequently machined workpiece W1 at the spindle center position which is the machining position.

In this embodiment, the ascending/descending member 41 can move the grip member 42 having the first workpiece grip part 42*a* for gripping the machined workpiece W and the second workpiece grip part 42*b* loaded with the subsequently machined workpiece W1, in the up/down direction between the workpiece change position "c" and the workpiece unloading position "d". This enables the changing of the workpieces with a simple structure.

In this embodiment, since the machined workpiece W carried out of the machine is reversed by 180 degrees to be transferred to the next lathe 1', continuous machining of a workpiece is enabled without separately installing a reversing device in the course of the transfer.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A lathe comprising:

a bed;

a spindle headstock disposed in a longitudinal one side portion of said bed;

a tailstock disposed on the another side portion of said bed to be coaxial with a spindle axis of said spindle headstock; and a pair of first and second tool posts disposed between said tailstock and said spindle headstock, wherein said first and second tool posts are arranged to be capable of facing each other across the spindle axis of said spindle headstock, and holding parts that are disposed on turrets of said first and second tool posts are capable of pulling out a machined workpiece supported by said spindle headstock from said spindle headstock by holding the machined workpiece therebetween;

a workpiece holder having a first support part supporting the machined workpiece which is pulled out and a second support part on which a subsequently machined workpiece is loaded, wherein said workpiece holder is reciprocatable in a direction orthogonal to the spindle axis between a standby position set outside a machining area and a workpiece receiving position where said workpiece holder receives the machined workpiece and the subsequently machined workpiece;

wherein said workpiece holder is movable in the direction orthogonal to the spindle axis so as to position the second support part at the workpiece receiving position where the second support part receives the subsequently machined workpiece, after the first support part receives the machined workpiece at the workpiece receiving position; and a workpiece loader having a first workpiece grip part gripping the machined workpiece supported by the first support part and a second workpiece grip part loading the subsequently machined workpiece on the second support part, wherein said workpiece loader is ascendable/descendible in an ascendable/descendible direction perpendicular to the spindle axis between a workpiece change position where the machined workpiece is changed to the subsequently machined workpiece and a workpiece unloading position from which the machined workpiece is carried out of the lathe.

2. The lathe according to claim 1, wherein said first and second tool posts are disposed on a vertical line passing through the spindle axis to be on an upper side and a lower side across the spindle axis.

3. A lathe comprising:

a bed;

a spindle headstock disposed in a longitudinal one side portion of said bed;

a tailstock disposed on the another side portion of said bed to be coaxial with a spindle axis of said spindle headstock; and a pair of first and second tool posts disposed between said tailstock and said spindle headstock, wherein said first and second tool posts are arranged to be capable of facing each other across the spindle axis of said spindle headstock, and holding parts that are disposed on turrets of said first and second tool posts are capable of pulling out a machined workpiece supported by said spindle headstock from said spindle headstock by holding the machined workpiece therebetween;

a workpiece holder having a first support part supporting the machined workpiece which is pulled out and a second support part on which a subsequently machined workpiece is loaded, wherein said workpiece holder is reciprocatable in a direction orthogonal to the spindle axis between a standby position set outside a machining area and a workpiece receiving position where said workpiece holder receives the machined workpiece and the subsequently machined workpiece;

wherein said workpiece holder is movable in the direction orthogonal to the spindle axis so as to position the second support part at the workpiece receiving position where the second support part receives the subsequently machined workpiece, after the first support part receives the machined workpiece at the workpiece receiving position; and a workpiece loader having a first workpiece grip part gripping the machined workpiece supported by the first support part and a second workpiece grip part loading the subsequently machined workpiece on the second support part, wherein said workpiece loader is ascendable/descendible in an ascendable/descendible direction perpendicular to the spindle axis between a workpiece change position where the machined workpiece is changed to the subsequently machined workpiece and a workpiece unloading position from which the machined workpiece is carried out of the lathe;

wherein said workpiece loader reverses the machined workpiece which is carried out of the lathe by 180 degrees to transfer the machined workpiece to a subsequent machining process or transfer the machined workpiece to a workpiece stocker.

4. The lathe according to claim 3, wherein said first and second tool posts are disposed on a vertical line passing through the spindle axis to be on an upper side and a lower side across the spindle axis.

* * * * *